United States Patent [19]
Walker

[11] 3,976,279
[45] Aug. 24, 1976

[54] HIGH PRESSURE VALVE

[75] Inventor: Robert D. Walker, Erie, Pa.

[73] Assignee: High Pressure Equipment Co. Inc., Erie, Pa.

[22] Filed: Nov. 5, 1973

[21] Appl. No.: 412,782

[52] U.S. Cl................................. 251/267; 251/214
[51] Int. Cl.². ........................................ F16K 31/50
[58] Field of Search .......... 251/214, 264, 265, 266, 251/267, 268, 269, 270, 271

[56] References Cited
UNITED STATES PATENTS

| 2,780,233 | 2/1957 | Volpin ............................ 251/267 X |
| 3,007,674 | 11/1961 | Lorenz et al.................... 251/266 X |
| 3,327,992 | 6/1967 | Billeter ............................... 251/267 |
| 3,409,271 | 11/1968 | Kallenbach ..................... 251/266 X |
| 3,788,600 | 1/1974 | Allen ................................. 251/266 |

Primary Examiner—Alan Cohan

[57] ABSTRACT

A valve is disclosed that has an upper stem and a lower stem that are received in a gland and connected together by a threaded connection. The gland has an axial slot and the lower valve stem has a diametrically extending pin that extends into the slot so that when the upper stem is rotated, the lower stem moves axially into engagement with a valve seat thereby eliminating a rotation of the lower stem which insures against the stem rotating on the valve seat and prevents galling and reduces backlash between the upper stem and the lower stem to being almost non-existent without requiring periodic adjustment to compensate for wear.

1 Claim, 2 Drawing Figures

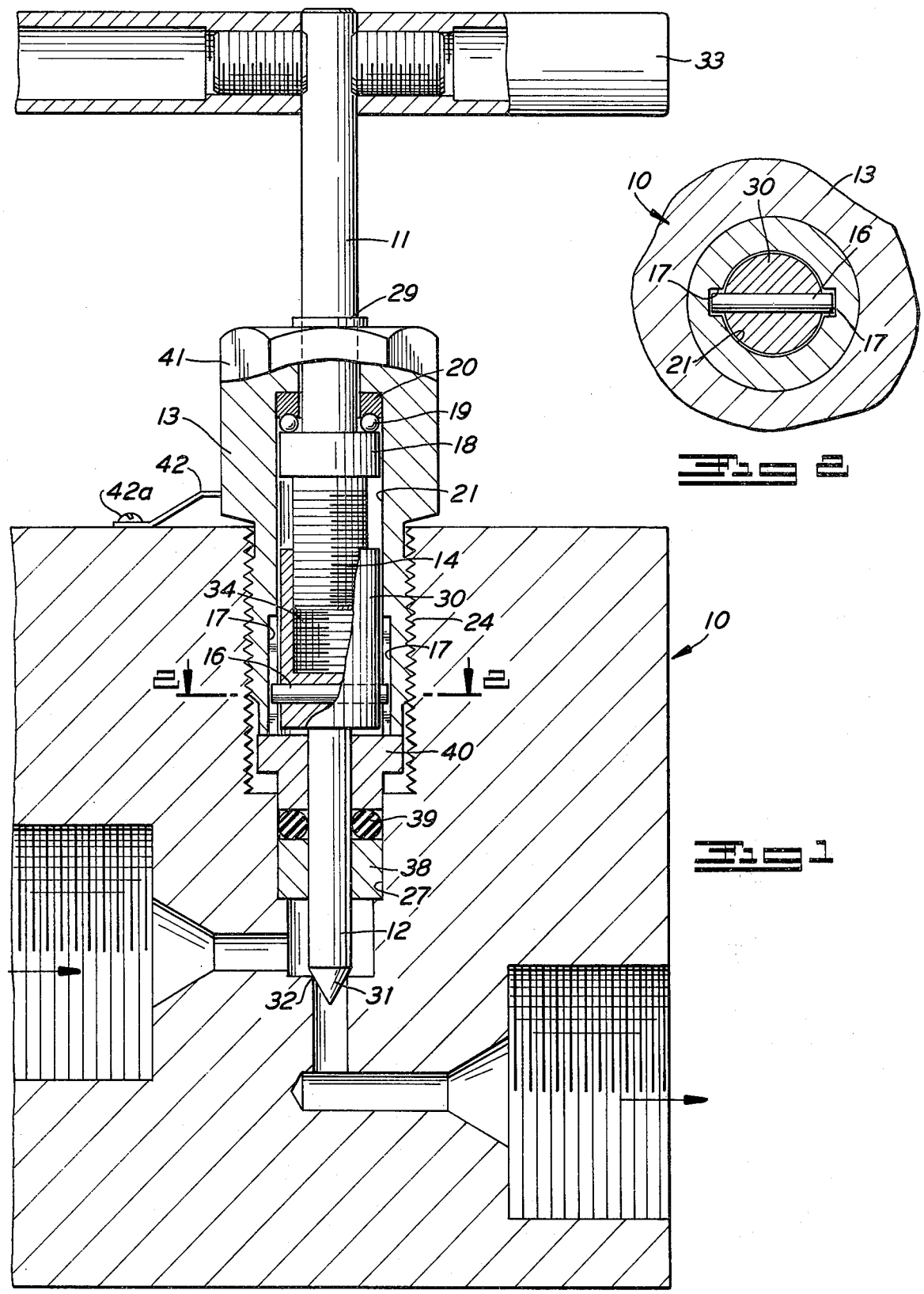

HIGH PRESSURE VALVE

OBJECTS OF THE INVENTION

It is an object of the invention to provide an improved valve.

Another object of the invention is to provide a valve stem assembly that insures against rotation of the lower stem relative to the valve seat thereby eliminating galling.

Another object of the invention is to provide a valve stem assembly that provides pure axial motion between the lower stem member and pure rotational motion of the upper stem member thereby eliminating galling of the valve seat and reducing backlash to being nearly non-existent.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 shows a longitudinal cross sectional view of the valve according to the invention.

FIG. 2 shows a cross sectional view taken on line 2—2 of FIG. 1.

DETAILED DESCRIPTION OF THE DRAWINGS

The valve shown has a body 10 with an upper stem 11 connected to the lower stem 12 by a threaded connection. The valve stems are received in the gland 13. The pin 16 extends through the enlarged part 30 of the lower stem into the axial slot 17 formed on the inside of the counterbore 21 in the gland thus restraining the lower stem 12 against rotation and guiding the lower stem 12 in axial movement thereby preventing galling of the seat 31 on the lower end of the lower stem 12 on the valve seat 32 on the body when the handle 33 is rotated.

The outside surface of the enlarged part 30 of the lower stem 12 is cylindrical and has a relatively snug fit on the inside cylindrical surface of the counterbore 21. The inside of the enlarged part 30 of the lower stem 12 has a threaded bore 34 that receives the enlarged male threaded member 14 which is fixed to the upper stem 11. The upper stem 11 has the intermediate enlarged portion 18 between the enlarged member 14 and the upper stem 11 which has an upwardly disposed shoulder that engages the balls 19 of the anti-friction bearing and forms a lower race for the bearing. The upper race 20 is received in the bottom of the counterbore 21 and provides a reaction for the axial force that is exerted on the enlarged member 18 when the handle 33 is rotated to force the valve surface 31 into engagement with the seat 32. A snap ring 29 is received in an external groove on the upper stem 11 and prevents the stem from moving axially downward when the lower stem 12 is moved away from the seat 32.

The gland 13 has external threads 24 on its lower end which are received in the threaded bore in the body. The threaded bore that receives the gland has a first counterbore 27 that receives the lower spacer 38 and the O-ring 39, as well as the lower end of the top packing washer 40.

The gland 13 has a wrench receiving surface 41 by which it may be tightened down against the top packing washer 40 to exert a force between the top washer 40 and the lower spacer 38 thereby providing the proper sealing force between the O-ring 39 and the lower stem 12. A suitable locking device 42 will be provided which is a clamping member locked to the body by a screw 42 that engages the body.

It will be noted that when the handle is rotated, threads on enlarged member 14 engage the threads on enlarged member 30 and when the upper stem is rotated, the lower stem is moved axially, restrained against rotation by the pin 16.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a valve and stem assembly comprising
   a valve having a body,
   a gland having a wall defining a bore and a cylindrical counter bore therein,
   diametrically spaced axially extending slots in said wall defining said counterbore,
   an upper stem and a lower stem extending through said bore in said gland and into said counterbore, and disposed in axial alignment with each other,
   said upper stem having an enlarged cylindrical portion thereon in said counterbore,
   an enlarged male threaded member on said upper stem adjacent said enlarged cylindrical portion,
   said lower stem having an enlarged hollow internally threaded portion thereon threadably receiving said male threaded member,
   a pin extending through said enlarged hollow internally threaded portion of said lower stem,
   the ends of said pin being slidably received in said axially extending slots,
   whereby said lower stem is restrained to move in an axial direction when said upper stem is rotated relative to said lower stem,
   and valve means on the lower end of said lower stem adapted to engage valve means on said valve body,
   said valve body having a threaded bore therein,
   said gland having threaded means on the outside thereof threadably engaging said threaded bore in said valve body,
   packing means disposed around said lower stem in said body and an upper packing washer supported on said packing means,
   and said gland adapted to be rotated, thereby exerting a pressure on said upper packing washer.

* * * * *